United States Patent
Song et al.

(10) Patent No.: US 8,630,219 B2
(45) Date of Patent: Jan. 14, 2014

(54) SUPPORTING A MULTICAST SESSION WITHIN A WIRELESS COMMUNICATIONS NETWORK

(75) Inventors: Bongyong Song, San Diego, CA (US); Arvind Santhanam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1061 days.

(21) Appl. No.: 12/235,417

(22) Filed: Sep. 22, 2008

(65) Prior Publication Data

US 2009/0080364 A1 Mar. 26, 2009

Related U.S. Application Data

(60) Provisional application No. 60/974,829, filed on Sep. 24, 2007.

(51) Int. Cl.
*H04H 20/71* (2008.01)

(52) U.S. Cl.
USPC .......................................................... 370/312

(58) Field of Classification Search
None
See application file for complete search history.

(56) References Cited

U.S. PATENT DOCUMENTS

| | | | |
|---|---|---|---|
| 5,883,885 A * | 3/1999 | Raith | 370/311 |
| 2003/0114156 A1 | 6/2003 | Kinnavy | |
| 2003/0148785 A1 | 8/2003 | Mangal et al. | |
| 2005/0111394 A1 * | 5/2005 | Jung et al. | 370/312 |
| 2006/0182058 A1 | 8/2006 | Jeong et al. | |
| 2006/0246924 A1 * | 11/2006 | Balasubramanian et al. | 455/459 |
| 2006/0253442 A1 * | 11/2006 | Rhee et al. | 707/8 |
| 2007/0049314 A1 * | 3/2007 | Balachandran et al. | 455/518 |
| 2007/0058628 A1 * | 3/2007 | Palnati et al. | 370/390 |
| 2007/0281722 A1 * | 12/2007 | Gao | 455/518 |
| 2009/0080362 A1 | 3/2009 | Song | |
| 2013/0136051 A1 | 5/2013 | Song | |

FOREIGN PATENT DOCUMENTS

| | | |
|---|---|---|
| EP | 1734714 A1 | 12/2006 |
| JP | 2004187279 A | 7/2004 |
| JP | 2005533414 A | 11/2005 |
| JP | 2006518125 A | 8/2006 |

(Continued)

OTHER PUBLICATIONS

International Preliminary Report on Patentability, PCT/US2008/077516, International Bureau, The International Bureau of WIPO, Apr. 1, 2010.

(Continued)

*Primary Examiner* — Otis L Thompson, Jr.
(74) *Attorney, Agent, or Firm* — James T. Hagler; Raphael Freiwirth (57) ABSTRACT

Methods of supporting a multicast session within a wireless communications network are provided. An access terminal adjusts a monitoring rate of a downlink control channel either (i) after transmitting a multicast registration message in a sector that is not supporting a given multicast session or (ii) after receiving an announce message announcing the given multicast session. An access network anticipates the monitoring rate adjustment, and sends a message advertising the given multicast session (e.g., a broadcast overhead message (BOM)) based on the adjusted monitoring rate. Further, the announce message sent by the access network can be sent on the downlink control channel, and can be sent based on expected paging cycles, or monitoring rates, of the downlink control channel at one or more access terminals within the network prior to the monitoring rate adjustment.

68 Claims, 7 Drawing Sheets

(56) References Cited

FOREIGN PATENT DOCUMENTS

| | | |
|---|---|---|
| JP | 2006339893 A | 12/2006 |
| JP | 2006340129 A | 12/2006 |
| JP | 2006528456 A | 12/2006 |
| JP | 2007516657 A | 6/2007 |
| JP | 2007518290 T | 7/2007 |
| KR | 20040065284 | 7/2004 |
| RU | 2003131395 A | 4/2005 |
| WO | WO2004051926 A1 | 6/2004 |
| WO | 2004075416 A2 | 9/2004 |
| WO | WO2005015776 A1 | 2/2005 |
| WO | WO2006087067 A1 | 8/2006 |
| WO | WO2006109961 A2 | 10/2006 |
| WO | 2007059791 | 5/2007 |
| WO | 2007127114 | 11/2007 |

OTHER PUBLICATIONS

International Search Report, PCT/US2008/077516, International Searching Authority, European Patent Office, Jun. 3, 2009.
Written Opinion, PCT/US2008/077516, International Searching Authority, European Patent Office, Jun. 3, 2009.
European Search Report—EP11152134, Search Authority—The Hague Patent Office, Mar. 2, 2011.
"3GPP2 C. S0054-A, Version 1.0, cdma2000 High Rate Broadcast-Multicast Packet Data Air Interface Specification" 3rd Generation Partnership Project 2 3GPP2, vol. 3GPP2.S0054-A, No. 1.0, Feb. 14, 2006, pp. 1-169, XP002520330.

* cited by examiner

SUPPORTING A MULTICAST SESSION WITHIN A WIRELESS COMMUNICATIONS NETWORK

CLAIM OF PRIORITY UNDER 35 U.S.C. §119

The present application for patent claims priority to Provisional Application No. 60/974,829, entitled "METHODS OF SUPPORTING A MULTICAST SESSION WITHIN A WIRELESS COMMUNICATIONS NETWORK", filed Sep. 24, 2007, which is assigned to the assignee hereof and hereby expressly incorporated by reference herein in its entirety.

BACKGROUND OF THE INVENTION

1. Field of the Invention

The invention relates to communications in a wireless telecommunication system and, more particularly to supporting a multicast session within a wireless communications network.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3rd Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments of the present invention are directed to methods of supporting a multicast session within a wireless communications network are provided. An access terminal adjusts a monitoring rate of a downlink control channel either (i) after transmitting a multicast registration message in a sector that is not supporting a given multicast session or (ii) after receiving an announce message announcing the given multicast session. An access network anticipates the monitoring rate adjustment, and sends a message advertising the given multicast session (e.g., a broadcast overhead message (BOM)) based on the adjusted monitoring rate. Further, the announce message sent by the access network can be sent on the downlink control channel, and can be sent based on expected paging cycles, or monitoring rates, of the downlink control channel at one or more access terminals within the network prior to the monitoring rate adjustment.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Figure 1:
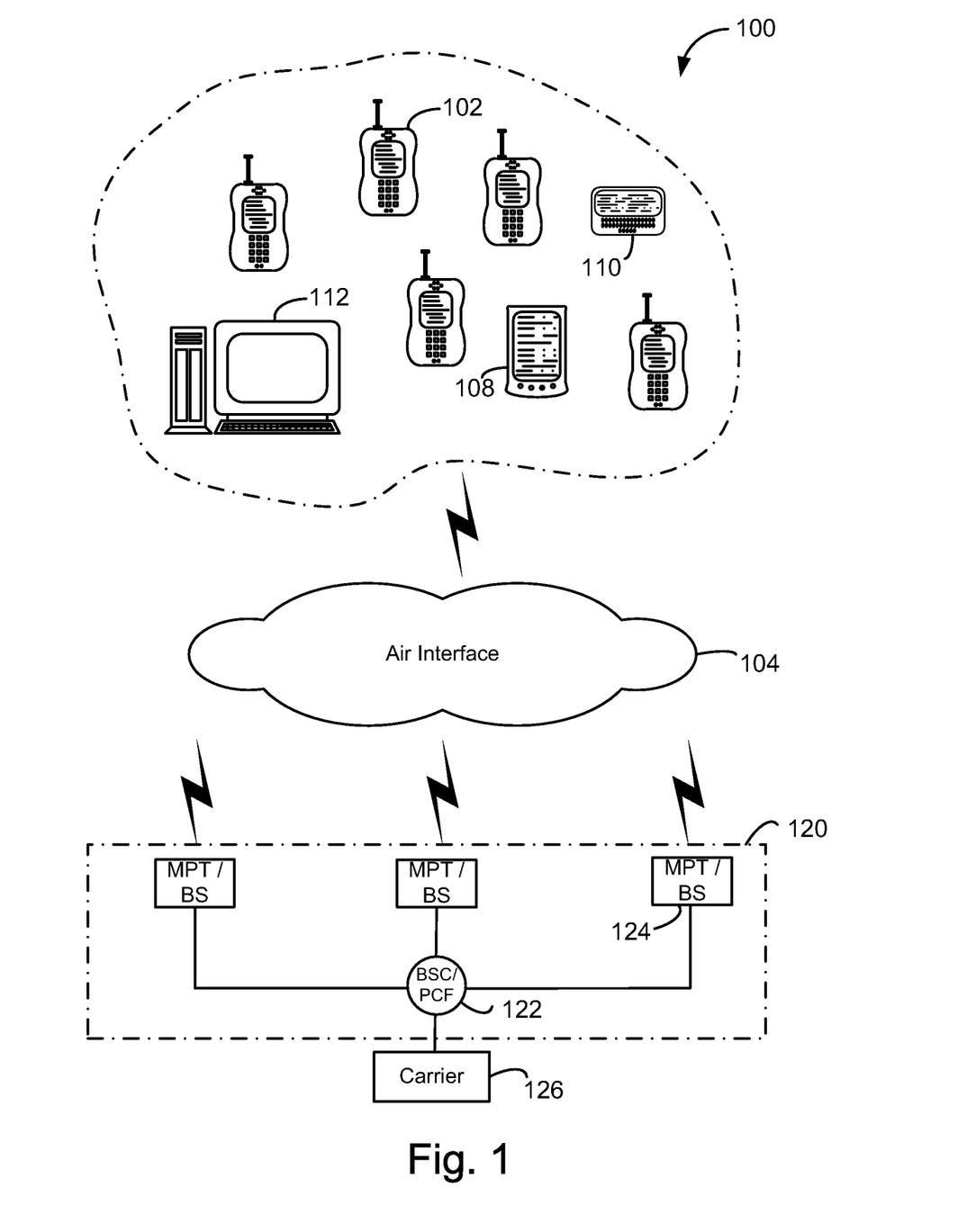
FIG. 1 is a diagram of a wireless network architecture that supports access terminals and access networks in accordance with at least one embodiment of the invention.

FIG. 1 illustrates a block diagram of one exemplary embodiment of a wireless communication system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or subcombination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
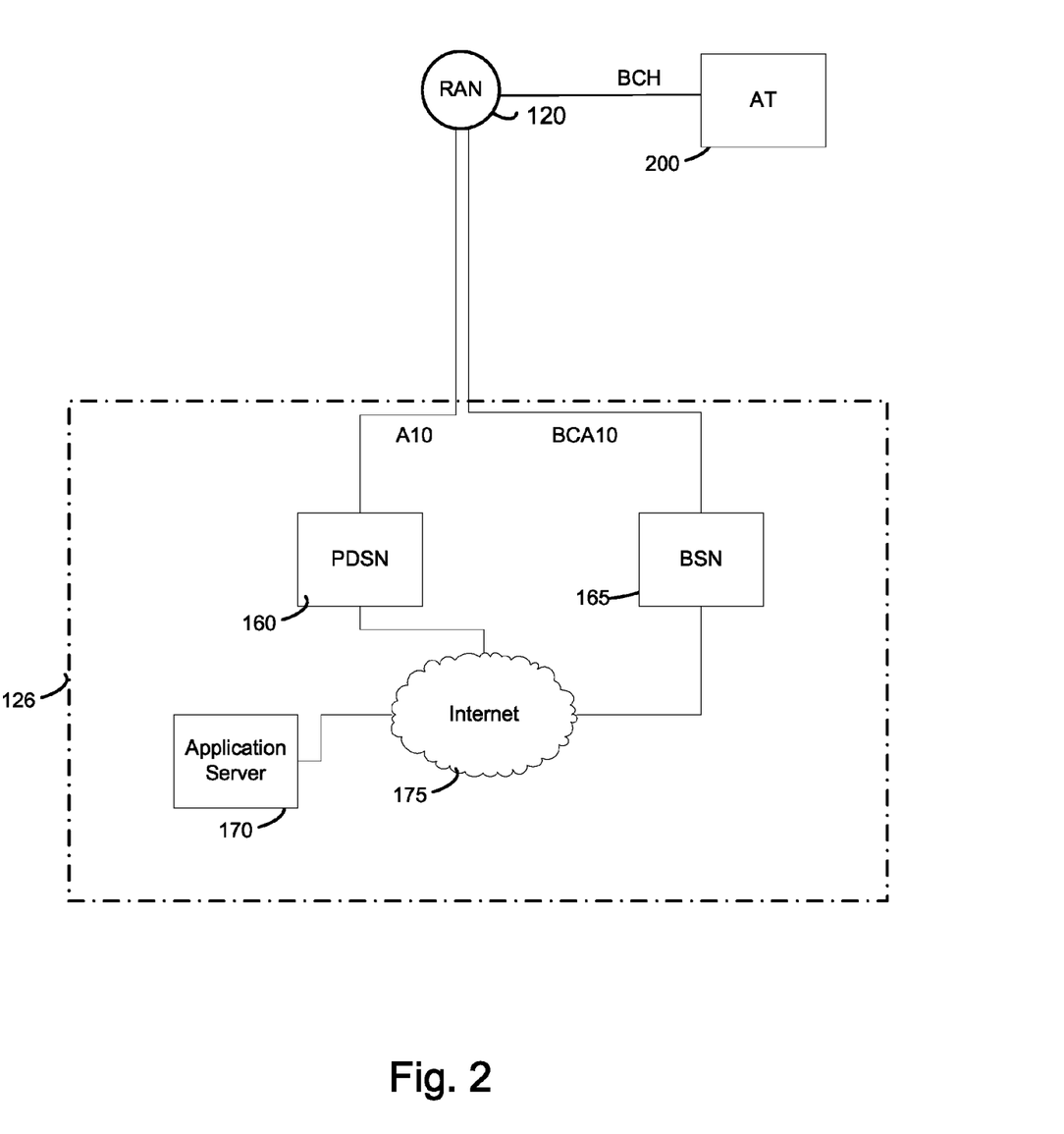
FIG. 2 illustrates the carrier network 126 according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
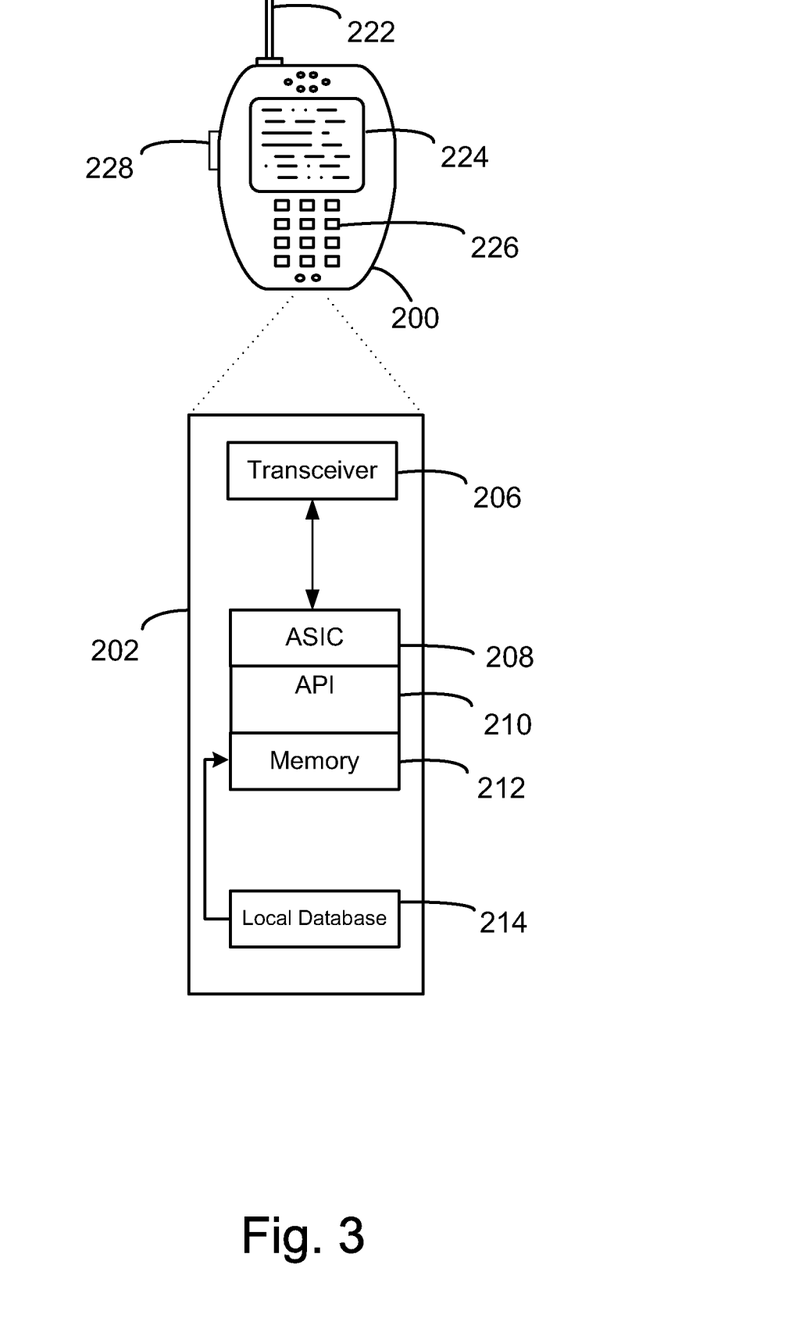
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
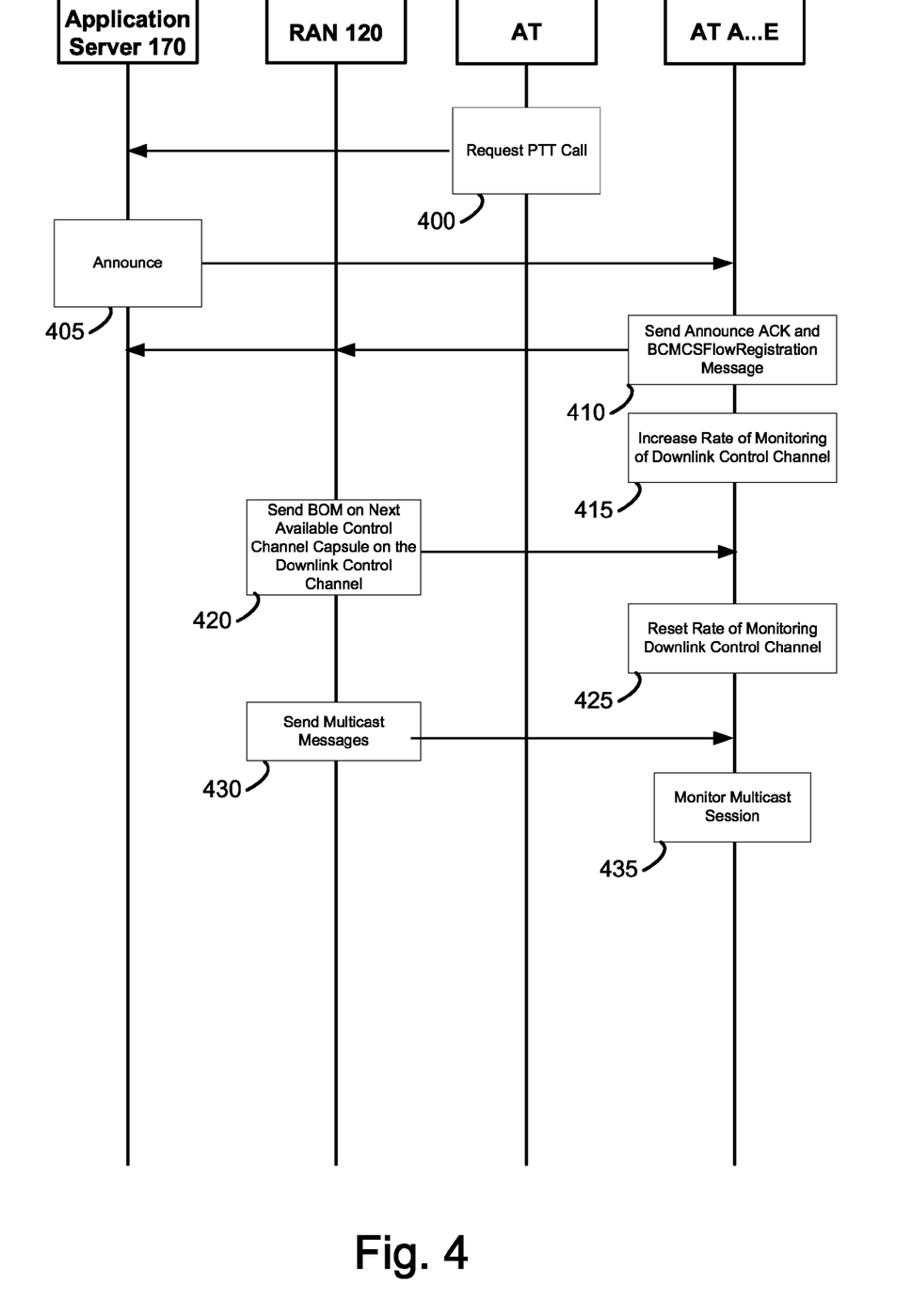
FIG. 4 illustrates a call set-up process for initiating a multicast session according to an embodiment of the present invention.

FIG. 4 illustrates a multicast messaging process according to an embodiment of the present invention. In 400, one of a plurality of access terminals in communication with the RAN 120 ("PTT initiator") requests to initiate a PTT session, or multicast session. Accordingly, the PTT initiator sends a PTT call request to the application server 170 (e.g., a PTT server). Next, in 405, the application server 170 announces the PTT session in a plurality of sectors. For example, the application server 170 forwards the announce message to the RAN 120 via the PDSN 160 and/or BSN 165, and the RAN 120 transmits the announce message over the air interface 104 (e.g., over a downlink control channel, etc.) to a plurality of ATs.

Figure 5:
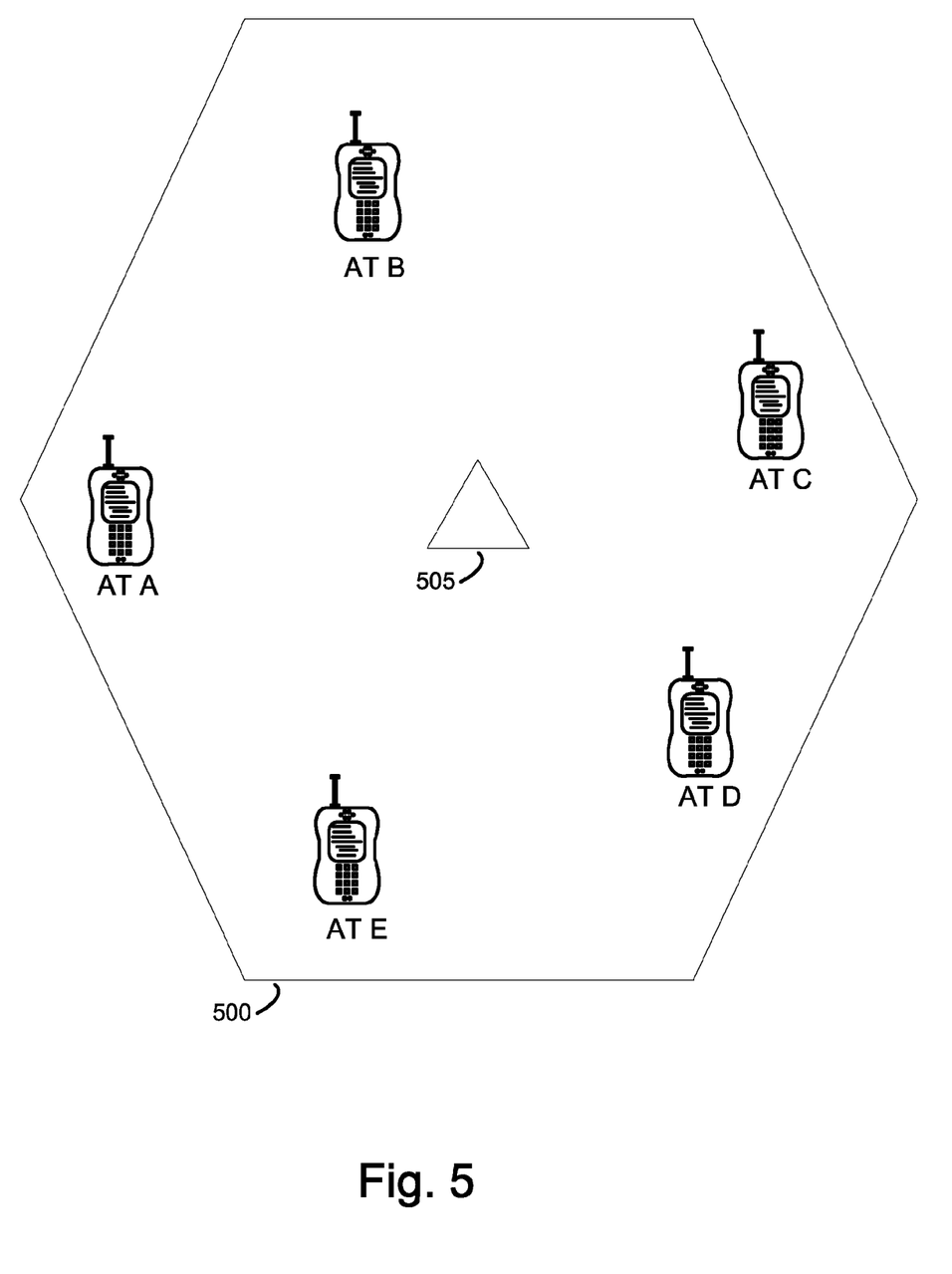
FIG. 5 illustrates a wireless communication system.

FIG. 5 illustrates a sector 500 of the wireless communication system 100 according to an embodiment of the present invention. The sector 500 includes a base station or MPT/BS 505. The sector 500, which corresponds to a region wherein ATs can be served by the base station 505, further includes ATs A through E. The PTT initiator discussed above with respect to 400 can be one of ATs A through E, or alternatively may correspond to an AT within another sector (not shown). For convenience of explanation, it will be assumed hereinafter that the PTT initiator is not present within sector 500 of FIG. 5. In 405, the announce message is transmitted in multiple sectors, including sector 500, within the wireless communication system 100.

In an example, the announce message sent in 405 may be bundled with an access control message (ACM), with the ACM providing feedback protocols for ATs. In other words, the ACM determines a manner in which ATs can respond to the announce message. For a further discussion of ACMs and feedback scheduling protocols, see U.S. Provisional Patent Application No. 60/974,796, entitled "METHODS OF RESPONDING TO AN INTERACTIVE MULTICAST MESSAGE WITHIN A WIRELESS COMMUNICATION SYSTEM", assigned by the assignee hereof, and expressly incorporated by reference herein in its entirety. Further, the announce message sent in 405 can be packaged within a data over signaling (DOS) message that is sent over a downlink control channel. For a further discussion of packaging announce messages into a DOS message for transmission over the downlink control channel, see U.S. Provisional Patent Application No. 60/974,833, entitled "MULTICAST MESSAGING WITHIN A WIRELESS COMMUNICATION SYSTEM", filed on Sep. 24, 2007, assigned by the assignee hereof, and expressly incorporated by reference herein in its entirety.

Figure 6:
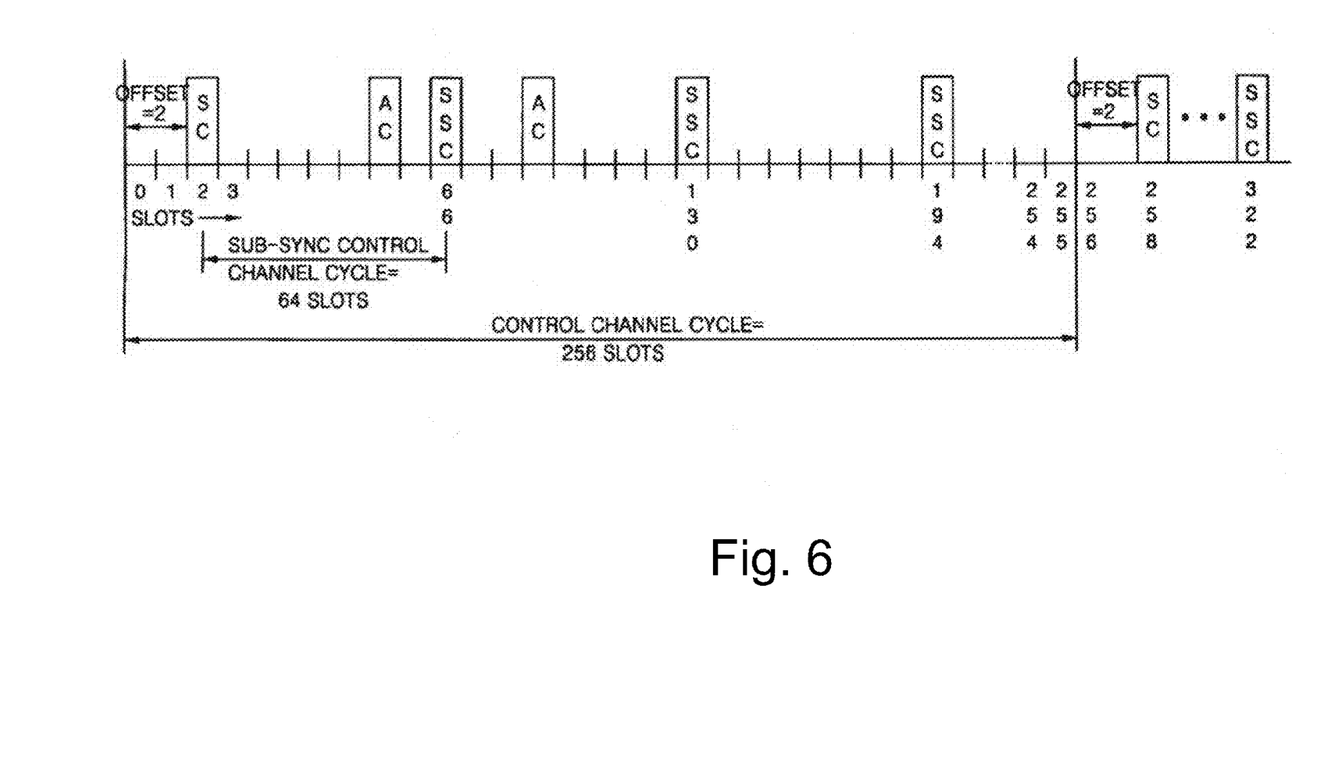
FIG. 6 illustrates a control channel cycle of a downlink control channel.

FIG. 6 illustrates a control channel cycle of the downlink control channel. Referring to FIG. 6, each control channel cycle includes a total of 256 slots. Each control channel cycle includes a synchronous control channel capsule (SC), an asynchronous control channel capsule (AC), and a number of sub-synchronous control channels (SSCs). One SC is regularly or periodically transmitted at a given timeslot for each control channel cycle having a period of 256 slots, whereas the AC is transmitted at "random", or at non-synchronous timeslots, within the control channel cycle. The SC is first transmitted at a timeslot corresponding to "T mod 256=Offset", and then retransmitted at a timeslot corresponding to "T mod 4=Offset", where T denotes a system time and an Offset denotes a time value delayed from a fixed time, which are included in the control channel header. Each SC may include a plurality of control channel MAC layer packets, whereas each AC includes only one control channel MAC layer packet. As each MPT/BS 124 periodically transmits one or more control channel MAC layer packets, interference (e.g., inter-cell interference) may occur if each MPT/BS 124 transmits at the same time. Accordingly, a different offset is applied to the SC for each MPT/BS 124 to avoid collisions. The MPT/BS may transmit as many as three SSC capsules within one control channel period or 256 slot cycle. Each SSC typically transmits only one control channel MAC layer packet. Assuming an offset value of 2, the SSCs are transmitted at time slots 66, 130 and 194. Control channel capsules (e.g., SCs, ACs, SSCs, etc.) are generally well-known in the art within BCMCS systems, and as such a further description thereof has been omitted for the sake of brevity.

Returning to 405 of FIG. 4, each of ATs A . . . E can have a different paging cycle of the downlink control cycle for a number of reasons, such as a paging delay requirement, battery length criteria, etc. The paging cycle of the downlink control channel is the time period or interval at which a given AT checks, or monitors, the downlink control channel. For example, commonly used paging cycles for monitoring downlink control channels within conventional multicast sessions include 426 milliseconds (ms), 213 ms, 106.7 ms, etc. Thus, in 405, to ensure that as many ATs receive the announce message as possible, the RAN 120 waits for a "conservative" control channel capsule on the downlink control channel (e.g., the least common multiplier among possible paging cycles used at the ATs). For example, if the RAN 120 determines that ATs are configured to use paging cycles of 106.7 ms, 213 ms, and 426 ms, then the least common multiplier (LCM) is 426 ms (i.e., 4×106.7, 2×213 and 1×426). Accordingly, in an example, the control channel capsule(s) for the announce message can be selected in order to maximize the number of ATs that receive the announce message. In another example, a paging cycle can be biased (e.g., towards 106.67 or 213 ms) depending on the relative percentage of ATs operating at each paging cycle as long as it is guaranteed that the AT with the largest paging cycle gets the Announce message.

Below, the process of FIG. 4 is described as performed at sector 500 within the RAN 120. However, it will be appreciated that the process of FIG. 4 may concurrently be performed at other sectors (not shown) within the RAN 120.

In 410, assume each of ATs A . . . E responds to the announce message by sending an announce ACK message on the reverse link access channel to the base station 505 of the RAN 120. 1×EV-DO standards provide the BCMCSFlowRegistration message for AT registration to multicast groups. BCMCSFlowRegistration messages include a listing of one or more BCMCS flows that a given AT is requesting to monitor. For example, if the announce message in 405 announces a PTT call associated with BCMCS Flow FLOW_1, then the BCMCSFlowRegistration messages sent in response to the announce message include FLOW_1. BCMCSFlowRegistration messages may be sent to the RAN 120 at different times during a multicast or PTT session, and not merely in response to an announce message.

In 410, assume each announce ACK message is further "bundled" with a BCMCSFlowRegistration message within a single access probe to register for the BCMCS flow associated with the announce message. In contrast, conventionally, announce ACKs and BCMCSFlowRegistration messages sent in response to announce messages are not necessarily bundled together, and are rather typically sent independently on different access probes. For a further discussion of how announce ACK messages and BCMCSFlowRegistration messages can be "bundled" together, see U.S. Provisional Application No. 60/974,831, entitled "Methods of Managing Acknowledgement Transmissions form Multicast Groups Members of A Multicast Group Within a Wireless Communications Network", filed Sep. 24, 2007, which is assigned to the assignee hereof and hereby expressly incorporated by reference herein in its entirety.

In 415, each AT sending the bundled announce ACK message and BCMCSFlowRegistration message in 410 sets its paging cycle of the downlink control channel to a given paging cycle. For example, the given paging cycle can be an aggressive, or relatively short, paging cycle, such that each AT monitors (e.g., wakes up and reads) the downlink control channel at a higher rate. In another example, the given paging cycle can correspond to a shortest paging cycle that is currently used among ATs A . . . E (e.g., 106.7 ms). It will be appreciated that, because one or more of ATs A . . . E may already be paging, or monitoring, the downlink control channel at the more "aggressive" rate, 415 does not necessarily imply that the paging cycle of each respective AT increases, but rather that the paging cycle of each AT that has sent a bundled announce ACK message/BCMCSFlowRegistration message is set to the same period, with that period being relatively aggressive, or short, such that the RAN 120 need not wait for a for a "reserved" downlink control channel capsule on which to send a subsequent broadcast overhead message (BOM).

The BOM is a message sent by the RAN 120 on the downlink control channel that identifies one or more multicast sessions being carried by the RAN 120, and also includes information (e.g., an interlace-multiplex (IM) pair) regarding how an access terminal can "tune" to a downlink broadcast channel (BCH) carrying the multicast messages. Conventionally, BOMs are sent by the RAN 120 at "reserved" slots of control channel capsules of the downlink control channel, such as a synchronous control channel capsule. However, as will be discussed below in greater detail, because ATs A . . . E set their paging cycles more aggressively in 415, the RAN 120 need not wait for the "reserved" BOM slot, but rather can send the BOM sooner, at least in some instances, as compared to the conventional art.

Accordingly, in 420, the RAN 120 receives the bundled announce ACK messages and BCMCSFlowRegistration messages from ATs A . . . E, and sends the BOM on a downlink control channel capsule of the downlink control capsule based on the paging cycle set at each of the respective ATs in 415. In an example, the RAN 120 and each of ATs A . . . E can be pre-configured such that the "aggressive" paging cycle responsive to the announce message is known at each respective communication entity. Accordingly, ATs A . . . E need not convey their respective paging cycle change to the RAN 120 because the RAN 120 can assume the change has been made based on the pre-configuration. Thus, because the RAN 120 knows the paging cycle of each AT that is awaiting the BOM (e.g., at least, during a given time period subsequent to receipt of the announce message), the RAN 120 need not wait for the reserved BOM slot(s) or control channel capsule(s), but rather can select the earliest control channel capsule that is expected to be paged by the ATs. It will be appreciated that the earliest control channel capsule that will be paged by the ATs varies based on which paging cycle is actually pre-configured at the ATs A . . . E and the RAN 120. For example, the earliest control channel capsule can be a next available asynchronous control channel capsule, a next available sub-synchronous control channel capsule, or can even, in some instances, be the next available synchronous control channel capsule. Additionally, the BOM message containing resource allocation information for the multicast call can be transmitted in subsequent sub-synchronous and synchronous paging cycles for purposes of reliability of transmission as well as to allow ATs that have switched from other CDMA channels to decode the BOM message if they missed the first one. ATs that have switched CDMA channels may miss the first BOM message that is transmitted in the CDMA channel in which the multicast call is hosted.

In 425, upon receiving the BOM from the RAN 120, each of ATs A . . . E "resets" its paging cycle back to the previous level from before 415. For example, the paging cycle need not be maintained at more aggressive levels in order to conserve battery power at the ATs. In another example, the triggering event that causes the ATs to reset the paging cycle to pre-415 levels need not be receipt of a first BOM from the RAN 120, but rather can be any triggering event. Examples of such potential triggering events include the end or termination of the multicast session, the receipt of one or more additional BOMs subsequent to receipt of the first BOM, etc. Also, each AT need not use the same triggering event for the paging cycle reset.

After sending the BOM in 420, the RAN 120 can begin transmitting multicast messages, which are provided from the application or PTT server 170, within sector 500 to ATs A . . . E, 430. In 435, each of ATs A . . . E that is interested in monitoring the multicast session can tune to the downlink BCH in the manner indicated by the BOM (e.g., based on the IM pair indicated for the BCMCSFlowID of the announced PTT session), and can monitor the PTT session.

Figure 7:
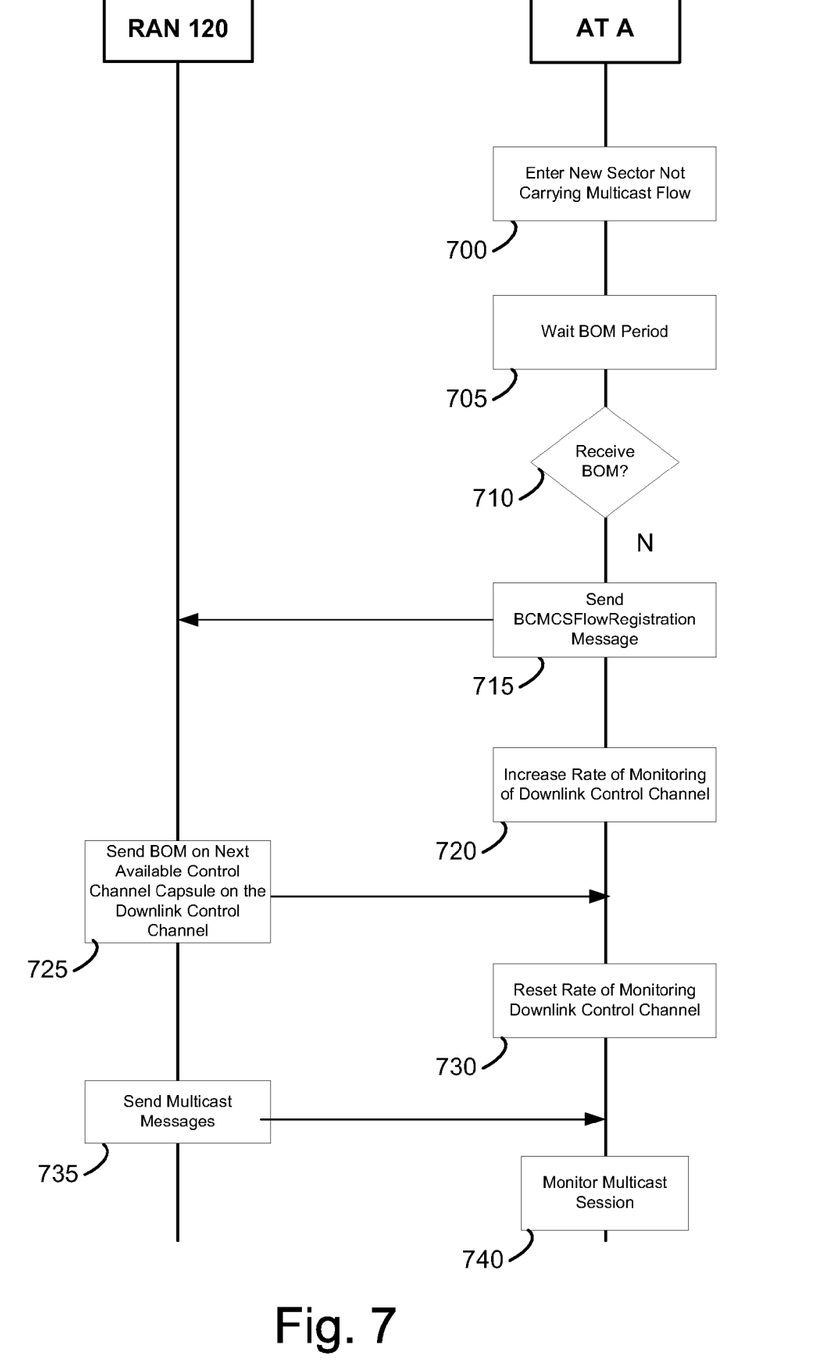
FIG. 7 illustrates a multicast messaging process according to another embodiment of the present invention.

FIG. 7 illustrates a multicast messaging process according to another embodiment of the present invention. In FIG. 7, assume that a PTT session has already been announced and is currently being carried or supported by one or more sectors within the wireless communication system. In 700, AT A enters (e.g., powers-up within) or is handed off to a new sector that is not currently supporting the multicast session. For example, AT A's sector can correspond to a non-supporting sector, the concept of which is described in greater detail within U.S. Provisional Patent Application No. 60/974,808, entitled "METHODS OF SUPPORTING MULTICAST COMMUNICATIONS ASSOCIATED WITH OVERLAPPING CLUSTERS WITHIN A WIRELESS COMMUNICATIONS NETWORK", filed on Sep. 24, 2007, assigned by the assignee hereof, and expressly incorporated by reference herein in its entirety.

In 705, AT A waits for a BOM interval (e.g., an expected period at which the RAN 120 sends periodic BOMs) to determine whether AT A's new sector is already carrying the given multicast session. In 710, AT A determines whether any BOMs advertising the BCMCSFlowID for the PTT session are received within the BOM interval. Because it is assumed that the sector that AT A has entered is not supporting the multicast session, AT A receives no BOMs during the wait period, and the process advances to 715.

In 715, AT A sends a BCMCSFlowRegistration message to the RAN 120 to request that AT A be registered for the PTT session and that the RAN 120 support the PTT session within AT A's sector. In 720, similar to 415 of FIG. 4, AT A sets its paging cycle of the downlink control channel to a given paging cycle, with the given paging cycle set relatively aggressively and being known or expected at the RAN 120. Next, similar to 420 of FIG. 4, in 725, the RAN 120 transmits the BOM advertising the BCMCSFlowID for the PTT session on a given control channel capsule of the downlink control channel, where the given control channel capsule is selected or determined based on the given paging cycle at AT A. Thus, the RAN 120 interprets a BCMCSFlowRegistration message being sent in a non-supporting sector as an indicator that the AT sending the BCMCSFlowRegistration message will, at least temporarily, establish an "aggressive" paging cycle. In another example, while not illustrated in FIG. 7, if the call is set up in a different CDMA Channel or carrier, the BOM message in the other CDMA Channel or carrier can redirect ATs using the same algorithm to the Channel in which the PTT call is carried or hosted. In other words, in the non-hosting carrier, the re-direct BOM can be sent earlier and the AT can page the non-hosting carrier more aggressively, as in embodiments of the invention described herein.

In 730, similar to 425 of FIG. 4, upon receiving the BOM from the RAN 120, AT A "resets" its paging cycle back to the previous level from before 720. For example, the paging cycle need not be maintained at a more aggressive level throughout the PTT session in order to conserve battery power at AT A. In another example, the triggering event that causes the ATs to reset the paging cycle to pre-720 levels need not be receipt of a first BOM from the RAN 120, but rather can be any triggering event. Examples of such potential triggering events are provided above with respect to 415 of FIG. 4.

After sending the BOM in 725, the RAN 120 can begin transmitting multicast messages, which are provided from the application or PTT server 170, to AT A, 735. In 740, AT A tunes to the downlink BCH in the manner indicated by the BOM (e.g., based on the IM pair indicated for the BCMCS-FlowID of the announced PTT session), and monitors the PTT session.

In view of the above-description of the embodiments of FIGS. 4 through 7, it will be appreciated that a delay associated with BOM transmission during the initiation of a PTT session associated with call set-up or supporting the PTT session in a new sector can be reduced by setting ATs to the same, more aggressive paging cycle.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, aspects of embodiments of the invention can include logical implementations of the functions described herein. Accordingly, those skilled in the art will appreciate that embodiments of the invention are not limited to the examples provided herein.

The methods, sequences and/or algorithms described in connection with the embodiments disclosed herein may be embodied directly in hardware, in a software module executed by a processor, or in a combination of the two. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer-readable medium including code stored thereon for performing the functions, steps, sequence of actions, and/or algorithms disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of monitoring a downlink control channel, comprising:

adjusting a rate at which an access terminal monitors the downlink control channel in expectation of receiving a message advertising a given multicast session, wherein the message advertising the given multicast session is a periodic message and wherein the adjusting is performed in expectation of receiving the message at an asynchronous or aperiodic time that is earlier than and deviates from a next periodic transmission of the message; and receiving the message advertising the given multicast session on the downlink control channel.

2. The method of claim 1, further comprising:
   transmitting, from the access terminal, a multicast registration message to an access network, the multicast registration message requesting registration of the access terminal to the given multicast session,
   wherein the adjusting step is performed after the transmitting step, and the receiving step receives the message advertising the given multicast session from the access network in response to the multicast registration message.

3. The method of claim 2, wherein a wireless communication protocol associated with the given multicast session designates a given control channel capsule on the downlink control channel for messages that advertise multicast sessions, and the asynchronous or aperiodic time corresponds to an earlier control channel capsule than the given control channel capsule.

4. The method of claim 3, wherein the earlier control channel capsule is a next available control channel capsule on the downlink control channel after the access network receives the multicast registration message.

5. The method of claim 2, further comprising:
   receiving, from the access network, an announce message announcing the given multicast session,
   wherein the transmitting step bundles the multicast registration message with an acknowledgment message acknowledging the announce message.

6. The method of claim 2, further comprising:
   waiting a given period to receive the message advertising the given multicast session,
   wherein the transmitting step is performed if the message advertising the given multicast session is not received within the given period.

7. The method of claim 6, wherein a wireless communication protocol associated with the given multicast session designates a given control channel capsule on the downlink control channel for messages that advertise multicast sessions, and the given period is at least equal to a period between successive instances of the given control channel capsule.

8. The method of claim 6, wherein the waiting step is performed upon entry of the access terminal into a new sector.

9. The method of claim 1, further comprising:
   receiving, from an access network, an announce message announcing a given multicast session to a plurality of access terminals,
   wherein the adjusting step is performed in response to the announce message.

10. The method of claim 1, wherein the adjusting step increases the rate at which the access terminal monitors the downlink control channel.

11. The method of claim 1, further comprising:
   resetting, after the receiving step, the adjusted rate to a rate at which the access terminal monitors the downlink control channel prior to the adjusting step.

12. The method of claim 1, wherein the message advertising the given multicast session further indicates a manner in which the access terminal can tune to the given multicast session on a downlink broadcast channel.

13. The method of claim 12, wherein the message advertising the given multicast session is a broadcast overhead message (BOM) that lists a broadcast multicast service (BCMCS) flow identifier of the given multicast session in association with an interlace-multiplex (IM) pair upon which multicast media for the given multicast session is being carried on the downlink broadcast channel.

14. The method of claim 12, wherein the message advertising the given multicast session is a broadcast overhead message (BOM) that is received on a first carrier and indicates a second carrier that is hosting the given multicast session.

15. The method of claim 1, wherein the message is configured to advertise that multicast media traffic associated with the given multicast session is currently being carried on a downlink broadcast channel along with physical-layer tuning instructions that notify the access terminal with regard to how to tune to the multicast media traffic on the downlink broadcast channel.

16. The method of claim 1, wherein the downlink control channel is a broadcast multicast service (BCMCS) control channel.

17. The method of claim 16, wherein the downlink control channel has a 256-slot control channel cycle.

18. The method of claim 1, wherein the message corresponds to a periodic scheduling message that is transmitted at a given periodic interval of the downlink control channel to advertise which multicast sessions are being carried in a given sector, further comprising:
   detecting that the downlink control channel is either (i) not transmitting the periodic scheduling message, or (ii) is transmitting the periodic scheduling message without advertising the given multicast session; and
   transmitting a reverse-link registration message to prompt a current serving sector to carry the given multicast session in response to the detection,
   wherein the adjusting step occurs in response to the transmission of the reverse-link registration message.

19. The method of claim 18, wherein the expectation is of receiving the message advertising the given multicast session in the asynchronous or aperiodic time that precedes the next periodic transmission of the message based on the given periodic interval.

20. The method of claim 1,
   wherein the message corresponds to a periodic scheduling message that is transmitted at a given periodic interval of the downlink control channel to advertise which multicast sessions are being carried in a given sector, and
   wherein the receiving step receives the message based on the rate adjustment at the asynchronous or aperiodic time that precedes the next periodic transmission of the message based on the given periodic interval.

21. A method of scheduling a message advertising a given multicast session, comprising:
   receiving, from an access terminal, a multicast registration message, the multicast registration message requesting registration of the access terminal to a given multicast session;
   determining when to send the message advertising the given multicast session based on a first rate that the access terminal is expected to monitor a downlink control channel after the receiving step, wherein the message advertising the given multicast session is a periodic message and wherein the first rate is different than a second rate that the access terminal is expected to monitor the downlink control channel before the receiving step; and
   transmitting the message advertising the given multicast session to the access terminal on the downlink control channel at an asynchronous or aperiodic time that is earlier than and deviates from a next periodic transmission of the message based on the determining step.

22. The method of claim 21, further comprising:
   transmitting an announce message to a plurality of access terminals to announce the given multicast session,
   wherein the receiving step receives the multicast registration message in response to the announce message.

23. The method of claim 22, wherein a conservative paging cycle based on a least common multiplier (LCM) of paging cycles including the second rate is used to schedule the transmission of the announce message,
wherein the first rate is higher than the second rate, and
wherein a paging cycle based on the first rate is used to schedule the transmission of the message advertising the given multicast session.

24. The method of claim 21, wherein a wireless communication protocol associated with the given multicast session designates a given control channel capsule on the downlink control channel for messages that advertise multicast sessions, and the asynchronous or aperiodic time corresponds to an earlier control channel capsule than the given control channel capsule.

25. The method of claim 24, wherein the earlier control channel capsule is a next available control channel capsule on the downlink control channel after the receiving step receives the multicast registration message.

26. The method of claim 21, wherein the receiving step receives, along with the multicast registration message, an acknowledgment message acknowledging the announce message.

27. The method of claim 21, wherein the multicast registration message is received in response to the access terminal entering into a new sector.

28. The method of claim 21, wherein the message advertising the given multicast session further indicates a manner in which the access terminal can tune to the given multicast session on a downlink broadcast channel.

29. The method of claim 28, wherein the message advertising the given multicast session is a broadcast overhead message (BOM) that lists a broadcast multicast service (BC-MCS) flow identifier of the given multicast session in association with an interlace-multiplex (IM) pair upon which multicast media for the given multicast session is being carried on the downlink broadcast channel.

30. The method of claim 28, wherein the message advertising the given multicast session is a broadcast overhead message (BOM) that is received on a first carrier and indicates a second carrier that is hosting the given multicast session.

31. The method of claim 21,
wherein the message corresponds to a periodic scheduling message that is transmitted at a given periodic interval of the downlink control channel to advertise which multicast sessions are being carried in a given sector, and
wherein the transmitting step transmits the message at the asynchronous or aperiodic time that precedes the next periodic transmission of the message based on the given periodic interval in response to the determination that the access terminal is expected to monitor the downlink control channel based on the first rate instead of the second rate.

32. An access terminal, comprising:
means for adjusting a rate at which the access terminal monitors a downlink control channel in expectation of receiving a message advertising a given multicast session, wherein the message advertising the given multicast session is a periodic message and wherein the adjusting is performed in expectation of receiving the message at an asynchronous or aperiodic time that is earlier than and deviates from a next periodic transmission of the message; and
means for receiving the message advertising the given multicast session on the downlink control channel.

33. The access terminal of claim 32, further comprising:
means for transmitting a multicast registration message to an access network, the multicast registration message requesting registration of the access terminal to the given multicast session,
wherein the means for adjusting adjusts the rate after the means for transmitting transmits the multicast registration message, and the means for receiving receives the message advertising the given multicast session from the access network in response to the multicast registration message.

34. The access terminal of claim 33, further comprising:
means for receiving, from the access network, an announce message announcing the given multicast session,
wherein the means for transmitting bundles the multicast registration message with an acknowledgment message acknowledging the announce message.

35. The access terminal of claim 33, further comprising:
means for waiting a given period to receive the message advertising the given multicast session,
wherein the means for transmitting transmits the multicast registration message if the message advertising the given multicast session is not received within the given period.

36. The access terminal of claim 32, further comprising:
means for receiving, from an access network, an announce message announcing a given multicast session to a plurality of access terminals,
wherein the means for adjusting adjusts the rate in response to the announce message.

37. The access terminal of claim 32, further comprising:
means for resetting, after the means for receiving receives the message, the adjusted rate to a rate at which the access terminal monitors the downlink control channel prior to the adjustment.

38. The access terminal of claim 32, wherein the message advertising the given multicast session further indicates a manner in which the access terminal can tune to the given multicast session on a downlink broadcast channel.

39. An access network, comprising:
means for receiving, from an access terminal, a multicast registration message, the multicast registration message requesting registration of the access terminal to a given multicast session;
means for determining when to send a message advertising the given multicast session based on a first rate that the access terminal is expected to monitor a downlink control channel after the means for receiving receives the multicast registration message, wherein the message advertising the given multicast session is a periodic message and wherein the first rate is different than a second rate that the access terminal is expected to monitor the downlink control channel before the means for receiving receives the multicast registration message; and
means for transmitting the message advertising the given multicast session to the access terminal on the downlink control channel at an asynchronous or aperiodic time that is earlier than and deviates from a next periodic transmission of the message based on the determination of the means for determining.

40. The access network of claim 39, further comprising:
means for transmitting an announce message to a plurality of access terminals to announce the given multicast session,
wherein the means for receiving receives the multicast registration message in response to the announce message.

41. The access network of claim 40, wherein a conservative paging cycle based on a least common multiplier (LCM) of paging cycles including the second rate is used to schedule the transmission of the announce message, wherein the first rate is higher than the second rate, and wherein a paging cycle based on the first rate is used to schedule the transmission of the message advertising the given multicast session.

42. The access network of claim 39, wherein the multicast registration message is received in response to the access terminal entering into a new sector.

43. The access network of claim 39, wherein the message advertising the given multicast session further indicates a manner in which the access terminal can tune to the given multicast session on a downlink broadcast channel.

44. An access terminal, comprising:

logic configured to adjust a rate at which the access terminal monitors a downlink control channel in expectation of receiving a message advertising a given multicast session, wherein the message advertising the given multicast session is a periodic message and wherein the adjusting is performed in expectation of receiving the message at an asynchronous or aperiodic time that is earlier than and deviates from a next periodic transmission of the message; and logic configured to receive the message advertising the given multicast session on the downlink control channel.

45. The access terminal of claim 44, further comprising:

logic configured to transmit a multicast registration message to an access network, the multicast registration message requesting registration of the access terminal to the given multicast session, wherein the logic configured to adjust adjusts the rate after the logic configured to transmit transmits the multicast registration message, and the logic configured to receive receives the message advertising the given multicast session from the access network in response to the multicast registration message.

46. The access terminal of claim 45, further comprising:

logic configured to receive, from the access network, an announce message announcing the given multicast session, wherein the logic configured to transmit bundles the multicast registration message with an acknowledgment message acknowledging the announce message.

47. The access terminal of claim 45, further comprising:

logic configured to wait a given period to receive the message advertising the given multicast session, wherein the logic configured to transmit transmits the multicast registration message if the message advertising the given multicast session is not received within the given period.

48. The access terminal of claim 44, further comprising:

logic configured to receive, from an access network, an announce message announcing a given multicast session to a plurality of access terminals, wherein the logic configured to adjust adjusts the rate in response to the announce message.

49. The access terminal of claim 44, further comprising:

logic configured to reset, after the logic configured to receive receives the message, the adjusted rate to a rate at which the access terminal monitors the downlink control channel prior to the adjustment.

50. The access terminal of claim 44, wherein the message advertising the given multicast session further indicates a manner in which the access terminal can tune to the given multicast session on a downlink broadcast channel.

51. An access network, comprising:

logic configured to receive, from an access terminal, a multicast registration message, the multicast registration message requesting registration of the access terminal to a given multicast session;

logic configured to determine when to send a message advertising the given multicast session based on a first rate that the access terminal is expected to monitor a downlink control channel after the logic configured to receive receives the multicast registration message, wherein the message advertising the given multicast session is a periodic message and wherein the first rate is different than a second rate that the access terminal is expected to monitor the downlink control channel before the logic configured to receive receives the multicast registration message; and logic configured to transmit the message advertising the given multicast session to the access terminal on the downlink control channel at an asynchronous or aperiodic time that is earlier than and deviates from a next periodic transmission of the message based on the determination of the logic configured to determine.

52. The access network of claim 51, further comprising:

logic configured to transmit an announce message to a plurality of access terminals to announce the given multicast session, wherein the logic configured to receive receives the multicast registration message in response to the announce message.

53. The access network of claim 52, wherein a conservative paging cycle based on a least common multiplier (LCM) of paging cycles including the second rate is used to schedule the transmission of the announce message, wherein the first rate is higher than the second rate, and wherein a paging cycle based on the first rate is used to schedule the transmission of the message advertising the given multicast session.

54. The access network of claim 51, wherein the multicast registration message is received in response to the access terminal entering into a new sector.

55. The access network of claim 51, wherein the message advertising the given multicast session further indicates a manner in which the access terminal can tune to the given multicast session on a downlink broadcast channel.

56. A non-transitory computer-readable medium comprising instructions, which, when executed by an access terminal within a wireless communications system, cause the access terminal to perform operations, the instructions comprising:

program code to adjust a rate at which the access terminal monitors a downlink control channel in expectation of receiving a message advertising a given multicast session, wherein the message advertising the given multicast session is a periodic message and wherein the adjusting is performed in expectation of receiving the message at an asynchronous or aperiodic time that is earlier than and deviates from a next periodic transmission of the message; and program code to receive the message advertising the given multicast session on the downlink control channel.

57. The non-transitory computer-readable medium of claim 56, further comprising:

program code to transmit a multicast registration message to an access network, the multicast registration message requesting registration of the access terminal to the given multicast session, wherein the program code to adjust adjusts the rate after the program code to transmit transmits the multicast registration message, and the program code to receive receives the message advertising the given multicast session from the access network in response to the multicast registration message.

58. The non-transitory computer-readable medium of claim 57, further comprising:
program code to receive, from the access network, an announce message announcing the given multicast session,
wherein the program code to transmit bundles the multicast registration message with an acknowledgment message acknowledging the announce message.

59. The non-transitory computer-readable medium of claim 56, further comprising:
program code to wait a given period to receive the message advertising the given multicast session,
wherein the program code to transmit transmits the multicast registration message if the message advertising the given multicast session is not received within the given period.

60. The non-transitory computer-readable medium of claim 56, further comprising:
program code to receive, from an access network, an announce message announcing a given multicast session to a plurality of access terminals,
wherein the program code to adjust adjusts the rate in response to the announce message.

61. The non-transitory computer-readable medium of claim 56, further comprising:
program code to reset, after the program code to receive receives the message, the adjusted rate to a rate at which the access terminal monitors the downlink control channel prior to the adjustment.

62. The non-transitory computer-readable medium of claim 56, wherein the message advertising the given multicast session further indicates a manner in which the access terminal can tune to the given multicast session on a downlink broadcast channel.

63. A non-transitory computer-readable medium comprising instructions, which, when executed by an access network within a wireless communications system, cause the access network to perform operations, the instructions comprising:
program code to receive, from an access terminal, a multicast registration message, the multicast registration message requesting registration of the access terminal to a given multicast session;
program code to determine when to send a message advertising the given multicast session based on a first rate that the access terminal is expected to monitor a downlink control channel after the program code to receive receives the multicast registration message, wherein the message advertising the given multicast session is a periodic message and wherein the first rate is different than a second rate that the access terminal is expected to monitor the downlink control channel before the program code to receive receives the multicast registration message; and
program code to transmit the message advertising the given multicast session to the access terminal on the downlink control channel at an asynchronous or aperiodic time that is earlier than and deviates from a next periodic transmission of the message based on the determination of the program code to determine.

64. The non-transitory computer-readable medium of claim 63, further comprising:
program code to transmit an announce message to a plurality of access terminals to announce the given multicast session,
wherein the program code to receive receives the multicast registration message in response to the announce message.

65. The non-transitory computer-readable medium of claim 64, wherein a conservative paging cycle based on a least common multiplier (LCM) of paging cycles including the second rate is used to schedule the transmission of the announce message,
wherein the first rate is higher than the second rate, and
wherein a paging cycle based on the first rate is used to schedule the transmission of the message advertising the given multicast session.

66. The non-transitory computer-readable medium of claim 63, wherein the multicast registration message is received in response to the access terminal entering into a new sector.

67. The non-transitory computer-readable medium of claim 63, wherein the message advertising the given multicast session further indicates a manner in which the access terminal can tune to the given multicast session on a downlink broadcast channel.

68. A method of monitoring a downlink control channel, comprising:
adjusting a rate at which an access terminal monitors the downlink control channel in expectation of receiving a message advertising a given multicast session; and
receiving the message advertising the given multicast session on the downlink control channel,
wherein the adjusting occurs responsive to an uplink transmission configured to prompt an access network to transmit the message on the downlink control channel, and
wherein the adjusted rate permits the access network to transmit the message in response to the uplink transmission on the downlink control channel to the access terminal at an earlier point in time relative to the rate prior to the adjusting.

* * * * *